J. KAUFMAN.
STICK OF SHAVING SOAP.
APPLICATION FILED MAY 22, 1919.
1,380,388.
Patented June 7, 1921.
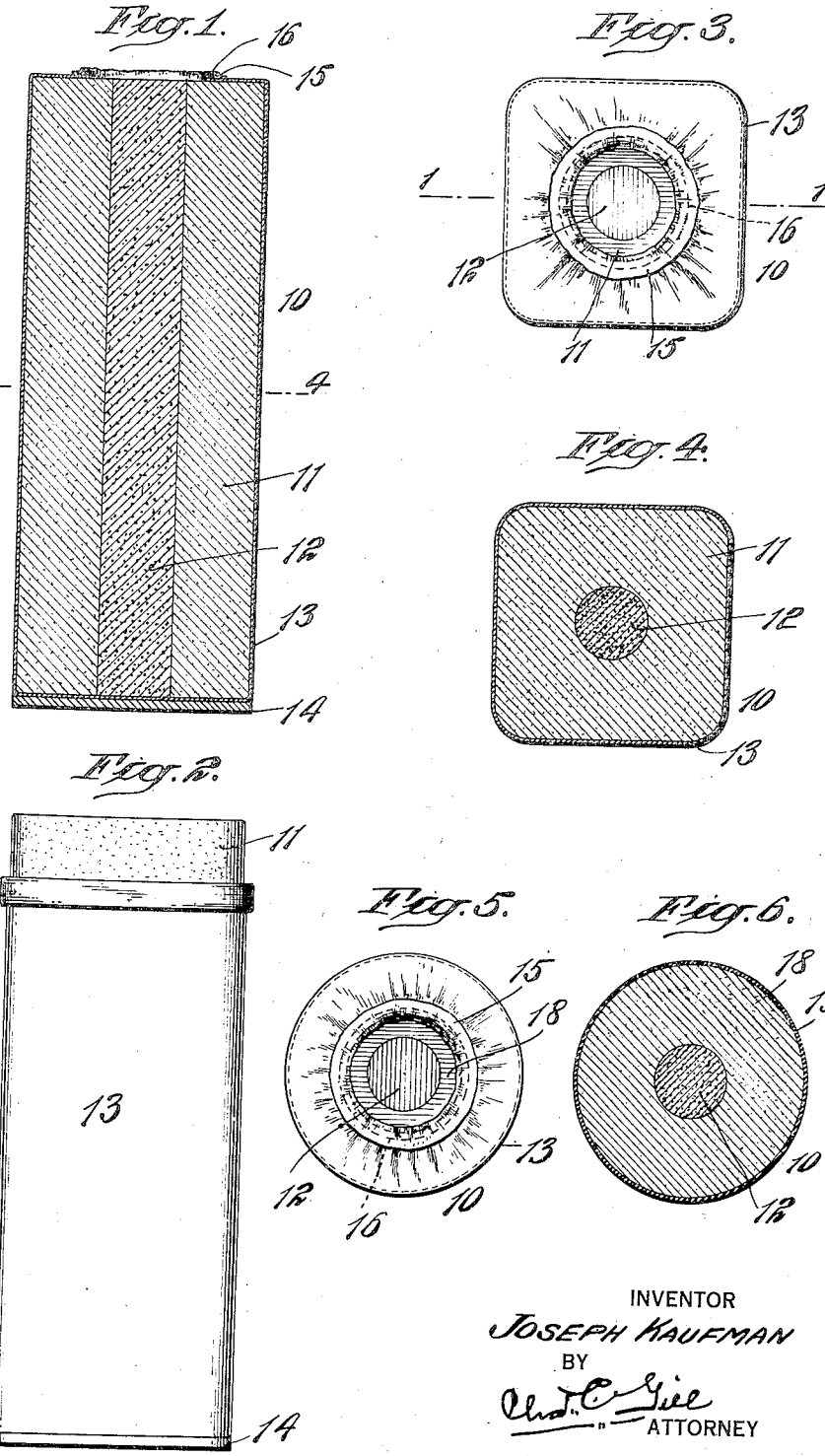
INVENTOR
JOSEPH KAUFMAN
BY
ATTORNEY

UNITED STATES PATENT OFFICE.

JOSEPH KAUFMAN, OF NEW YORK, N. Y., ASSIGNOR TO AMERICAN SAFETY RAZOR COMPANY, OF BROOKLYN, NEW YORK, A CORPORATION OF NEW YORK.

STICK OF SHAVING-SOAP.

1,380,388.

Specification of Letters Patent. Patented June 7, 1921.

Application filed May 22, 1919. Serial No. 298,875.

*To all whom it may concern:*

Be it known that I, JOSEPH KAUFMAN, a citizen of the United States, and a resident of New York city, in the county of New York and State of New York, have invented certain new and useful Improvements in Sticks of Shaving-Soap, of which the following is a specification.

The invention relates to a novel stick of shaving soap embodying several features of advantage. The soap contained in the stick I do not modify, except to supply a first class soap therein, but I combine therewith several features of novelty, one being a central vertical core of cocoa butter or equivalent oleaginous substance, another being an elastic casing which normally incloses the stick and which may be rolled downwardly from the outer end thereof as the stick is consumed, another being a rigid base secured to the lower end of the elastic casing upon which the stick may stand vertically, and another residing, in the preferred construction, in a substantially rectangular outline in cross-section of the stick, the corners of the rectangle being rounded.

The central core of cocoa butter or equivalent substance may also be applied to a shaving stick which is circular in cross-section, and likewise the elastic casing and the rigid base may be applied to the round stick of soap. I prefer, however, to give the stick of soap the exterior rectangular outline, with rounded corners, referred to hereinbefore, for several reasons, one being that the presence of the core of cocoa butter or the like does not lessen the quantity of soap that should be present in the stick, the outline of the stick serving to increase the quantity of soap from that which would be present in a round stick, even to an extent beyond the space occupied by the core of cocoa butter or the like, and another being that the stick of rectangular cross-section having the rounded corners is more easily held in the hand and less liable to slip therefrom than a stick which is circular in cross-section. It is commonly well known that sticks of shaving soap are usually wrapped in tin foil and that the tin foil presents features of disadvantage in that it has to be scraped off with a tool or with one's thumb-nail as the stick is consumed and frequently scratches the face of the user of the soap, when not sufficiently removed from the stick, and this disadvantage is remedied by my invention which provides an elastic casing, as very thin rubber, which may be rolled down on the stick as the latter becomes consumed, thus in a most convenient manner exposing the end of the stick of soap, and omitting the tin foil and its disadvantages. It is also commonly well known that some beards are stiff and difficult to soften preparatory to the shaving operation, and this situation my invention conveniently remedies by providing the core of cocoa butter or like material extending throughout the stick of shaving soap, the cocoa butter serving to combine with the soap in softening the beard and rendering the action of the razor smooth and painless and without injury to the skin of the person shaving, leaving the skin, after shaving, in a soft velvety state and lacking wholly in inflammation or unpleasant sensation. The oily nature of the cocoa butter combines with the lather of the soap to produce a lather of exceptional efficiency.

The invention has other features of advantage and will be understood from the detailed description hereinafter presented, reference being had to the accompanying drawings, in which:

Figure 1 is a central vertical section through a stick of shaving soap embodying the features of my invention, the section being on the dotted line 1—1 of Fig. 3;

Fig. 2 is a side elevation of the same, the elastic casing being shown as rolled down from the upper end of the stick so as to expose the soap at said end for practical use;

Fig. 3 is a top view of the same, the upper portion of the elastic casing being in the initial condition shown in Fig. 1;

Fig. 4 is a transverse section through the same, taken on the dotted line 4—4 of Fig. 1;

Fig. 5 is a top view illustrating features of my invention as applied to a stick of shaving soap which is circular in cross-section, and Fig. 6 is a transverse or horizontal section through the same.

In the drawings, referring to Figs. 1 to 4, inclusive, 10 designates the stick of shaving soap as a whole, 11 the soap composition, 12 the core of cocoa butter or equivalent oleaginous substance, 13 the elastic casing inclosing the stick, 14 the rigid base piece of fiber, metal or the like, secured to the lower end of said casing, and 15 a turned-over and hemmed edge at the mouth of the casing 13 inclosing, by preference, although not necessarily an elastic band 16 which serves to draw the upper end of the casing 13 with firmness over the upper end of the stick of shaving soap and also against the sides of said stick as said casing, at its upper end, is rolled downwardly over the stick, as illustrated in Fig. 2.

Apart from other features, one part of my invention resides in providing the stick of shaving soap 11 with a central opening extending longitudinally through it and containing a solid core of cocoa butter or the like 12. I have discovered that the combination of the cocoa butter with the shaving soap produces a lather which is of exceptional efficiency, especially for strong beards or tender skin, said lather serving to facilitate a very comfortable and desirable shaving operation and not only tending to soften the beard, but rendering the action of the razor blade painless and comfortable, the result being that a person shaving, with the use of my special shaving stick, may carry on the operation speedily and without danger of any unpleasant after effects so far as the skin on his face is concerned.

The casing 13 is of thin elastic material, preferably rubber, but may be of thin odorless pyroxylin material. The casing 13 very snugly encompasses the stick of soap, and at its upper end is carried over the top of the stick and preferably in a pocket formed by hemming a turned over portion thereof, is supplied with a rubber band 16 which draws the upper end of the casing snugly over the upper end of the stick of soap. The turned over portion 15 of the upper edges of the casing 13 affords a double thickness of the material which may be conveniently caught hold of and rolled outwardly and down the sides of the stick, as I illustrate in Fig. 2, wherein I designate the rolled over portion of the casing by the numeral 17. The case 13 will, at its upper end, be rolled downwardly as the stick 11 is consumed, and said casing will protect said stick from the effects of air and the like and aid in preserving the original character of the soap and the core of cocoa butter therein. The casing 13 avoids the employment of tin foil and the like on the stick of soap, and this in itself is a very desirable feature, since it avoids the necessity of removing portions of the tin foil as the stick is consumed, and in addition avoids the consequences which are quite usual of the tin foil in patches becoming detached from the body of the stick of soap during the use thereof, it frequently happening that the tin foil on a stick of shaving soap has almost entirely disappeared before the stick has been consumed one half way down. The elastic casing 13 also serves to facilitate the handling of the stick and the consequences which follow when a stick of shaving soap with a protected coating half-disappeared therefrom, is handled in the hand when the fingers are wet. The casing 13 always protects the exterior of the stick of soap, whereas the use of tin foil which disappears from the stick before the stick has been consumed, allows dust and the like to gather on the stick. A further advantage of the elastic casing 13 is that with its presence on the stick of shaving soap no danger of scratching the face with the usual tin foil coating for the sticks can exist.

The rigid base piece 14 may be of fiber, metal or any suitable material, and will preferably by cemented or otherwise fastened to the lower end of the casing 13 so that the stick of soap, when set upon a shelf, may have a substantial support, which might not be the case if said base were absent and the edges of the stick were repeatedly knocked against the surface of the shelf. I regard the base 14 as important, but not absolutely essential to the purposes of my invention.

By preference the stick of shaving soap is rectangular in cross-section, as shown in Figs. 1, 3 and 4 with the corners of the stick rounded, as illustrated, but the stick may be circular in cross-section, as I illustrate in Figs. 5 and 6, in which I use the same reference numerals as are employed in Figs. 1 to 4 inclusive, with the exception that I number the stick of soap 18 because it differs in outline from the stick 11 shown in Fig. 1, the exterior casing 13 and core 12 being the same as have been described with respect to Figs. 1 to 4 inclusive. I present Figs. 5 and 6 in order to indicate that the stick of soap may be circular in cross-section, when preferred, in lieu of rectangular in cross-section, although I would regard the form of the stick shown in Figs. 1 to 4 inclusive as preferable because the space occupied by the core of cocoa butter is recompensed for by the additional quantity of soap contained in the rectangular formation. The stick of shaving soap, whether in the form shown in Figs. 1 to 4 inclusive or in the form shown in Figs. 5 and 6, present similar advantages so far as the presence of the exterior casing 13, base-piece 14, and core 12 are concerned, and therefore I do not desire to limit my invention to the exterior outline of the stick of soap, although as hereinbefore suggested, I prefer the rectangular outline, with rounded corners, presented in Figs. 1 to 4 inclusive. The stick of soap shown in Figs. 5 and 6 will be employed in the same manner as in the stick presented in Figs. 1 to 4 inclusive, and therefore further explanation in respect to the article shown in Figs. 5 and 6 is not required.

The sticks of soap hereinbefore described may be packed in cartons or wrappers, as may be preferred, and if desired the upper end of the stick may have a piece of waxed paper applied on it before the mouth of the exterior casing is carried over said end, and thereafter the opening in said casing after the casing has been drawn over said end of said stick may be closed by a seal or the like, the waxed paper and seal when used being a protection for the upper end of the stick while the soap is carried in stock and not being necessary when the sticks are otherwise properly inclosed.

What I claim as my invention and desire to secure by Letters-Patent, is:

1. A stick of shaving soap incorporating therewith a longitudinal core of oleaginous substance other than soap adapted to combine with the soap in producing an efficient lather for softening the beard and protecting the skin against being irritated or unpleasantly affected by the action of the razor during the shaving process, said oleaginous core extending longitudinally of the shaving stick and confined and protected throughout its length by the soap composition of the stick to protect it from contact with the hand in use.

2. A stick of shaving soap according to claim 1, in which the said longitudinal core is composed of cocoa butter.

3. A stick of shaving soap according to claim 1, in which the stick of soap is of uniform diameter and rectangular in cross-section and has rounded corner portions.

4. A stick of shaving soap according to claim 1, having thereon a flexible casing adapted to cling to the stick and capable of being stretched and gradually rolled downwardly from off the outer end of the same as the soap is consumed.

Signed at Brooklyn, in the county of Kings and State of New York this 20th day of May, A. D. 1919.

JOSEPH KAUFMAN.

Witnesses:
 J. B. DE MESQUITA,
 ARTHUR RICHLAND.